Feb. 19, 1952 W. A. PENNOW 2,586,374
HIGH-INTENSITY AIRPORT RUNWAY MARKER LIGHT
Filed May 28, 1947 3 Sheets-Sheet 1

WITNESSES:

INVENTOR
Willis A. Pennow
BY
ATTORNEY

Feb. 19, 1952 W. A. PENNOW 2,586,374
HIGH-INTENSITY AIRPORT RUNWAY MARKER LIGHT
Filed May 28, 1947 3 Sheets-Sheet 2

WITNESSES:

INVENTOR
Willis A. Pennow.
BY
ATTORNEY

Feb. 19, 1952 W. A. PENNOW 2,586,374
HIGH-INTENSITY AIRPORT RUNWAY MARKER LIGHT
Filed May 28, 1947 3 Sheets-Sheet 3
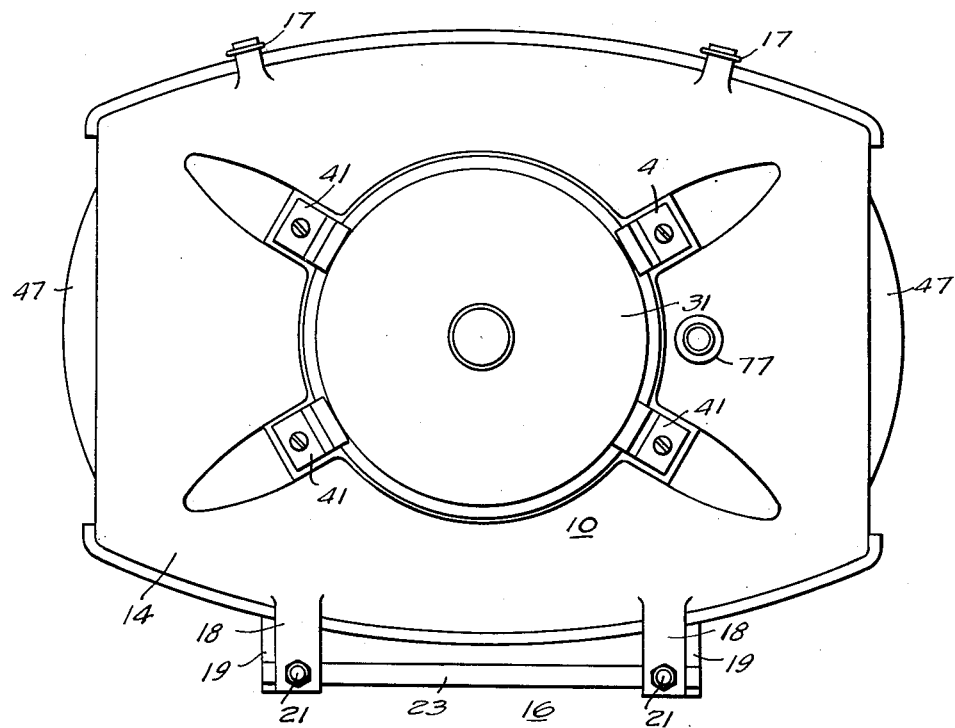
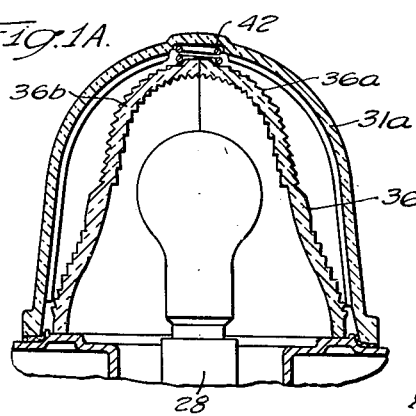
WITNESSES:
INVENTOR
Willis A. Pennow.
BY
ATTORNEY Patented Feb. 19, 1952

2,586,374

UNITED STATES PATENT OFFICE 2,586,374

HIGH-INTENSITY AIRPORT RUNWAY MARKER LIGHT

Willis A. Pennow, Cleveland, Ohio, assignor to Westinghouse Electric Corporation, East Pittsburgh, Pa., a corporation of Pennsylvania Application May 28, 1947, Serial No. 751,026

12 Claims. (Cl. 240—1.2)

My invention relates, generally, to lighting units and, more particularly, to contact or runway marker lights for use on airports and the like to facilitate landing and takeoff operations of aircraft.

Heretofore, contact lights of various types have been used for marking or indicating runways. These lights, which may be referred to as standard contact lights, have been of the low-intensity type having a candle power rating of about 1000. This is sufficient during restricted visibility conditions, that is, under conditions designated as one-fourth mile equivalent daytime visibility. Such lights, however, are inadequate when worse conditions are encountered, such as 200 feet equivalent daytime visibility or night conditions of 50 feet daytime equivalent visibility or less. Under such conditions, candle power output as high as 100,000 may be needed.

These so-called standard contact lights have another deficiency in that they are bidirectional, which causes the beam of light directed away from an incoming plane to illuminate airborne particles, thereby setting up a wall of light that prevents seeing the next light or lights in the line.

A further deficiency of such contact lights is the danger of the light rays or beam being obscured by high grass or other vegetation or snow because of the low mounting of these units. Such contact lights are usually mounted flush with the runway surface, or only slightly above it, so that any appreciable amount of snow covers the light unless removed.

Accordingly, it is an object of my invention, generally stated, to provide an improved contact or runway marker light suitable for effective use under a much greater range of conditions than the aforesaid standard contact light and which may be termed a high intensity contact light, as distinguished from the low intensity contact lights of the prior art.

A more specific object of my invention is to provide a contact light of the character described which is of simple and economical construction, yet rugged and reliable in operation, and which may be effectively used under a wide range of weather conditions.

Another object of my invention is to provide a contact light of the character described employing a plurality of optical systems or light producing elements for producing different light signals or indications of different degrees of intensity under widely varying weather conditions.

Another object of my invention is to provide a contact light which is so constructed that it may be used under certain weather conditions in the same manner and to produce the same results as regards light distribution, signal strength, etc., as the so-called standard contact lights or under other and less favorable weather conditions as regards visibility, etc., to provide light signals or indications of high intensity and having a different distribution.

A further object of my invention is to provide a contact light of the character described provided with an upper optical assembly for use under normal weather conditions and a pair of opposed unidirectional optical systems or assemblies of high candle power output for use in daytime or under greatly restricted visibility conditions.

Another object of my invention is to provide a contact light of the character described which is not only adapted for use as a runway marker but also for the purpose of outlining an approachway or indicating runway thresholds.

These and other important objects of my invention will become more apparent from the following detailed description when read in conjunction with the drawings, in which:

Fig. 1A is a sectional view of an alternate top lens arrangement for the contact light of Fig. 1.

Fig. 3 is a top plan view of the contact light of Figs. 1 and 2,

Fig. 4 is a partial view along line IV—IV of Fig. 1; and

Fig. 5 is an enlarged detail view of a portion of the device of Fig. 1.

In practicing my invention in its preferred form, it comprises a separable housing generally barrel-shaped in appearance and open at its ends. The upper and lower halves or sections of the housing are hinged together at one side and locked together at the other side by means of suitable fasteners. The housing is adapted for horizontal mounting on an adjustable support and is provided with a top opening over which the inverted cup-shaped lenses of the upper optical assembly are mounted. A low intensity lamp is mounted within the opening and extends above the top of the housing into the lenses. The end openings of the housings are closed by means of transparent lenses or covers and behind each lens is mounted a high intensity light producing element preferably in the form of a sealed beam lamp. The housing also contains the necessary control relay and cutout devices for the lamps.

Figure 1:
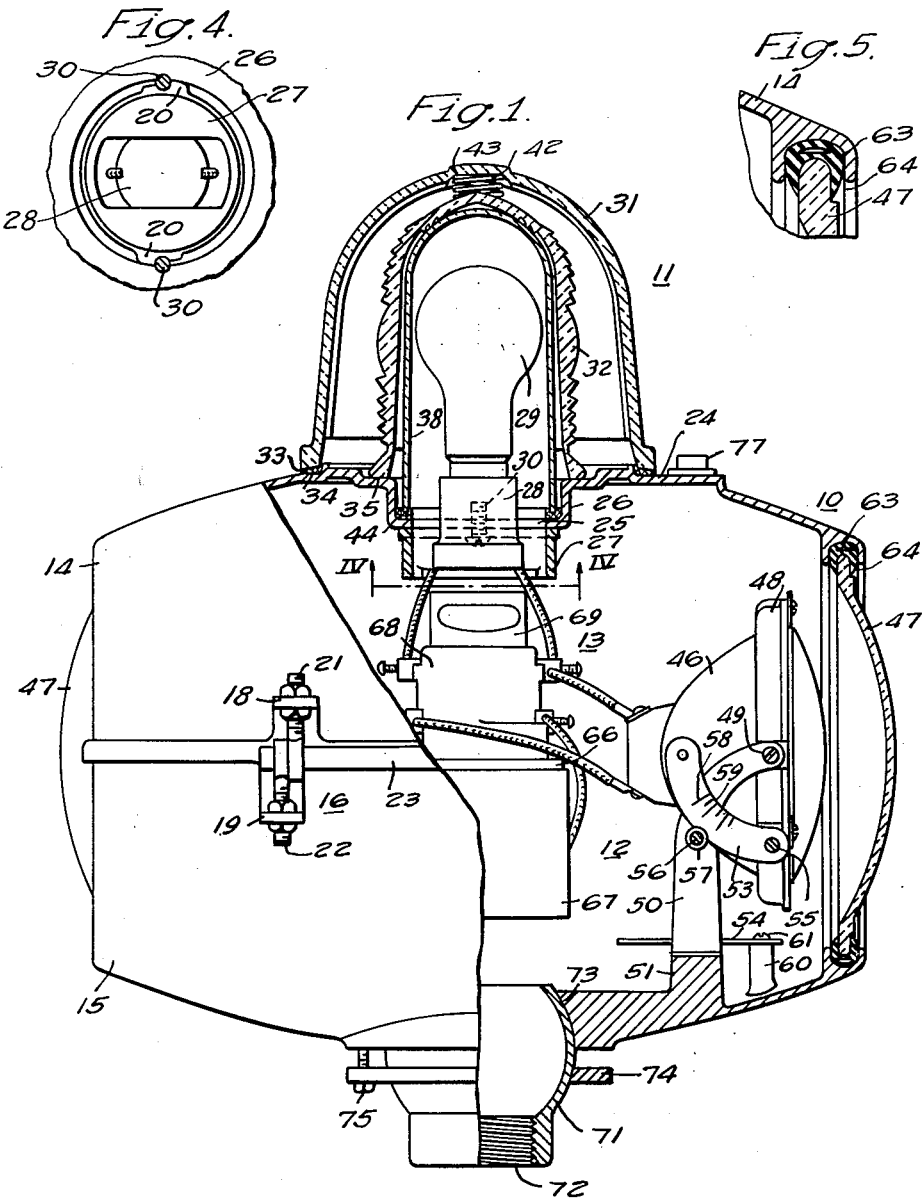
Figure 1 is a side elevational view, partly in section, of a contact light embodying the principal features of my invention.

Referring now to the drawings, it will be observed that there is shown in Fig. 1 a contact light comprising, generally, a housing 10, an upper optical assembly 11, a lower optical assembly 12, and a control and protective assembly 13.

The housing 10 is generally barrel-shaped, open at its opposite ends, and divided longitudinally to provide upper and lower sections 14 and 15, respectively.

Figure 2:
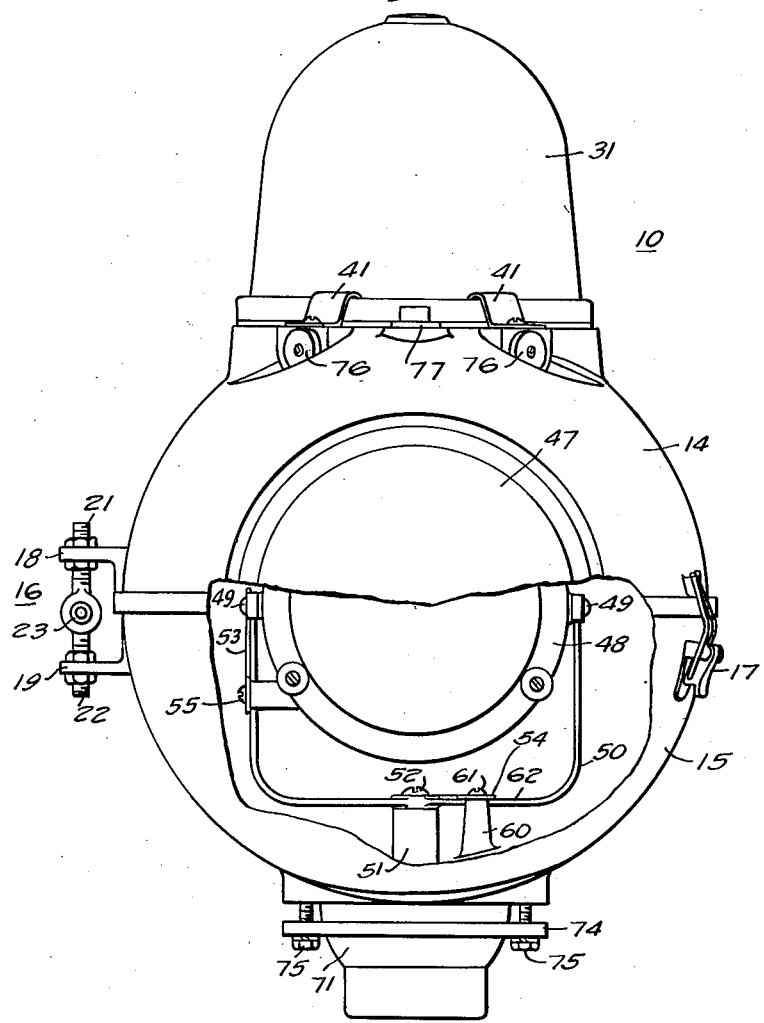
Fig. 2 is a view in end elevation, partly broken away to show structural details.

Since it is desirable to utilize the housing as a container for all of the parts of the device, the upper and lower sections are hinged together at one side by means of a hinge assembly 16 and are detachably secured together at the opposite sides by means of suitable fastening devices 17, as shown in Fig. 2.

In this instance, the hinge assembly 16 comprises a plurality of outwardly extending lugs 18 and 19 on each of the housing sections and a plurality of upper and lower eyebolts 21 and 22 adjustably secured thereto and engaging a common hinge pin or shaft 23. The hinge pin 23 may be in the form of a solid rod or a length of tubing, as shown in Fig. 2, which may be used as a sight to properly align the contact light. It is to be understood that the joint between the upper and lower housing sections 14 and 15 are sealed by means of a suitable gasket (not shown) in order to provide a tight joint.

In this instance, the upper optical assembly 11 is mounted directly on the top of the upper housing section 14. As shown, this section is provided with a generally flat upper surface 24 in the center of which is an opening 25. This upper surface is shaped as shown in Fig. 1 to provide suitable bearing surfaces for the lenses etc. of the upper optical assembly and is provided with an inwardly extending flange 26 to which is detachably secured the supporting ring 27 for the socket 28 which supports the low intensity lamp 29 of the upper optical assembly. As shown in Fig. 4, the ring 27 is provided with oppositely extending opposed ear portions 20 having open slots to receive the screws 30 to provide a bayonet locking arrangement. It will be understood that by means of this arrangement, relamping of the upper assembly may be effected by opening the housing without disturbing the upper lenses.

The upper optical assembly 11 may comprise various kinds and arrangement of lenses. In this instance, there is shown an outer prismatic lens 31 and an inner Fresnel lens 32. As shown, the outer lens is supported on a gasket 33 upon a flat bearing surface 34. The inner lens is supported directly on a flat bearing surface 35.

Another lens arrangement is shown in Fig. 1A wherein the outer lens 31a is of the same type, that is, a prismatic lens and the inner lens 36 is of a different type, in this instance a cone-shaped prismatic lens.

The type of lens arrangement used depends upon the type or kind of light distribution desired from this upper lens assembly. With the lens arrangement as shown in Fig. 1, a sharply controlled vertical distribution is obtained. When a prismatic inner globe is used as shown in Fig. 1A, a softer control of the vertical distribution is obtained which permits blending of the transition zone between high and low candle power areas without leaving dark areas adjacent either area.

Therefore, it will be apparent that when the contact light is used to outline a runway, and precise vertical control is advantageous, while dark areas adjacent the high candle power source are not harmful, the lens arrangement as shown in Fig. 1 is desirable and usually employed.

When, however, the contact light is to be used to outline an approachway or indicate a runway threshold and, therefore, must impart correct signals in a relatively wide vertical zone, the lens arrangement of Fig. 1A is more desirable.

It is to be understood, of course, that the inner lens, regardless of the type used, functions to impart vertical control to the light rays and that the outer lens imparts lateral control.

Color may be imparted to the projected light by the use of either, an inner color screen 38, as shown in Fig. 1, or by means of colored globes or lenses. When a Fresnel type inner lens is used as shown in Fig. 1, whole color may be obtained by using a colored outer lens. If a split or half coloring is desired, it is preferable to obtain it by means of the use of split or half inner color screens. In other words, the inner color screen 38 is split to provide two different colors.

Where the lens arrangement of Fig. 1A is used, half or split coloring may be obtained by using half or split inner lenses. In other words, the prismatic lens 36 may be formed in two halves or parts 36a and 36b, as shown. These halves or parts may be of different colors. If a solid one-piece inner lens is used, it may be of any desired color.

Regardless of the type of lens arrangement used, the lenses and color screens may be retained in position as shown in Figs. 1, 2 and 3. In this instance, the outer lens 31 is detachably secured to the top of the housing by means of clip members 41 as shown best in Fig. 2. The inner lens 32 may be held in position by means of a coil spring 42 interposed between the top thereof and an inner depression 43 in the top of the outer lens. The inner lens functions to hold the color screen 38 whether it is in one part or two parts in position on its seating gasket 44, as shown. Any other suitable mounting and retaining arrangement may be used.

It will be understood that, the lamp 29 of the upper optical assembly may be serviced when the housing is opened by simply detaching its supporting ring 27 from the flange 26. This eliminates the necessity of removing or otherwise disturbing the upper lenses.

The lower optical assembly 12 may comprise a pair of oppositely directed high-intensity light producing elements 46, only one of which is shown in the cut-away view of Fig. 1. It is preferred to use for these elements sealed-beam lamps one of which is mounted behind each of the transparent covers or lenses 47 in the end openings of the housing.

The lamps may be supported in any suitable manner such as shown in Fig. 1, by means of a holding ring 48 rotatably mounted on shoulder screws 49 for movement about a horizontal axis on a U-shaped trunnion 50, as shown in Fig. 2. As also shown in Fig. 2, the trunnion 50 is attached to the top of an upstanding lug 51 in the bottom of the housing by means of a shoulder screw 52 for rotation about a vertical axis.

Each of the lamps 46 is provided in this instance with a pair of adjusting quadrants 53 and 54 for accurately adjusting the direction of the beam. As shown the quadrant 53 for determining the vertical adjustment is rotatably attached at one end to the holding ring 48 by screw 55 and extends upwardly on the outside of one arm of the trunnion 50 with its lower edge riding on a screw 56. This screw carries a washer 57 which functions to clamp the quadrant in the desired position. The quadrant is graduated at 58 to provide a scale cooperative with a suitable mark or index 59 on the trunnion arm.

The other quadrant 54 is of the same construction except that one end is rotatably attached to an upstanding lug 60 on the bottom of the housing by means of a screw 61 and extends back over the connecting portion 62 of the trunnion 50 where it is adjustably clamped thereto by means of a screw and washer arrangement (not shown) similar to the screw 56 and washer 57 used on the other quadrant. This quadrant is also provided with a scale and an index is provided on the connecting portion 62 of the trunnion.

As shown in Fig. 1 and also in the enlarged partial view of Fig. 5, the lenses 47 are mounted in suitable gaskets 63 in the circular end channels 64 of the upper and lower housing sections. These gaskets are preferably channel shaped and of the balloon type. They so function as to provide a reasonably large yield so that when the housing sections are closed these gaskets insure a weather-tight seal between the sections and around the periphery of the lenses.

The lenses 47 may be clear or colored, plain or light controlling as desired. It may be desirable to use light controlling lenses in order to obtain a desired beam shape.

As shown in Fig. 1, the control and protective assembly 13 comprises a mounting panel 66 suitably supported within the housing which, in turn, supports a control relay 67 and a plurality of cutout assemblies 68, one for each of the lamps. These devices are in end-to-end relation as viewed in Fig. 1 but it is to be understood that each lamp is preferably provided with its own cutout device having removable switch or disconnecting elements 69 for completely isolating their respective lamp circuits from the supply circuit coming into the contact light.

The housing 10 may be supported in any suitable manner, preferably on a support which will provide both horizontal and vertical adjustment. In this instance, the housing is adjustably mounted on a ball-shaped or spherical support 71 threaded at 72 to engage a supporting post or the like and engaging a spherical opening 73 in the bottom of the housing, as shown in Fig. 1. The support 71 is adjustably secured to the housing by means of a ring member 74 adjustably attached to the housing by means of bolts 75.

If desired, the contact light may be provided with reflector buttons 76 disposed about the sides of the flat mounting surface of the upper half or section as shown in Fig. 2.

In order to provide for leveling the contact light, a circular spirit level 77 may be mounted on the flat upper surface of the housing, as shown in Fig. 1.

In view of the foregoing, it will be apparent that I have provided a dual purpose contact or runway marker light which embodies an upper optical system or assembly which functions as an ordinary or standard contact light and, in addition, a lower optical assembly made up of a pair of oppositely directed high-intensity light sources capable of projecting high intensity light beams in opposite directions.

A contact light constructed in this manner is capable of effective use under a wide range of operating conditions for marking or outlining runways or for use in outlining approachways or indicating runway thresholds.

The light is so constructed that it may be readily serviced and that it is weatherproof. It is adapted to be mounted appreciably above the ground level so as to be effective under all conditions.

While a detailed embodiment of my invention has been illustrated and described herein, it is to be understood that the principles of my invention may be embodied in other forms of devices for accomplishing substantially the same results.

I claim as my invention:

1. A high-intensity marker light for use on airport runways and the like comprising, a barrel-shaped housing having opposed end openings and a top opening intermediate its ends, said end openings being defined by circular seat portions, a transparent cover in each end opening and positioned in the seat portions, gasket means interposed between the seat portions and the edges of the cover members, means including a light source and reflector adjustably mounted in the housing behind each cover for projecting light beams horizontally in opposite directions, a lamp detachably mounted in said top opening and extending outside the walls of the housing, and lens means mounted on the housing over said opening and lamp.

2. A contact light for use on airport runways and the like comprising, a barrel-shaped housing open at the opposite ends and having a top opening intermediate its ends, a transparent cover member mounted in each end opening, each said cover member being disposed in sealed relation with the housing, means including a light source and reflector adjustably mounted within the housing behind each cover member for projecting light beams in opposite directions, a light source detachably mounted in the top opening of the housing and extending to the outside thereof, lens means mounted on the housing over said top opening and light source, and means secured to the bottom of the housing for adjustably supporting said housing.

3. A high-intensity runway marker light for use on airports and the like for marking runways comprising, an open ended elongated housing having a top opening and adapted for generally horizontal mounting, the open ends of said housing being defined by channel seating portions, transparent cover members mounted in each end opening of the housing in said seating portions in sealed relation with the housing, a sealed-beam lamp mounted within the housing at each end thereof for projecting light beams in opposite directions in a generally horizontal plane, a lamp socket mounted within the housing for receiving a lamp extending thereabove, lens means mounted on the housing over said last mentioned lamp, said lens means functioning to produce a predetermined light distribution, and means pivotally attached to the bottom of the housing for adjustably supporting same.

4. A high-intensity contact light for use on airports and the like for marking runways comprising, an open-ended elongated housing adapted for generally horizontal mounting, said housing having opposed top and bottom openings intermediate its ends, said top opening being defined by a depressed flange portion extending downwardly within the housing, a lamp socket supported within said flange portion for supporting an incandescent lamp above the top of the housing in a vertical position, lens means including inner and outer lens elements mounted on the housing over said lamp and top opening, said lens means functioning to control the light distribution from said lamp, a transparent cover member positioned in each end opening of the housing, a sealed-beam lamp positioned within the housing behind each cover member, adjustable support means for said lamps, and means cooperative with the bottom opening of the housing for adjustably supporting said housing.

5. A contact light for use on airport runways and the like comprising, an elongated housing open at opposite ends, said housing having a hinged top section with a top opening therein intermediate its ends, means attached to the bottom of the bottom section of the housing for adjustably supporting the housing, a transparent cover member positioned in each end opening of the housing, a sealed-beam lamp adjustably mounted within the housing at each end thereof for projecting opposed light beams of high intensity in opposite directions in a generally horizontal direction, a lamp mounted in the top opening of the top section and extending thereabove, and lens means including inner and outer prismatic lens elements mounted on the top section of the housing over said lamp, said lens means functioning to produce a predetermined light distribution, thereby to provide a contact light suitable for use day or night under a wide variety of weather conditions.

6. A contact or runway marker light for use on aircraft landing fields comprising, an elongated housing open at opposite ends and adapted for horizontal mounting, said housing having a hinged top section, a transparent cover member in each of the end openings of the housing, means for adjustably supporting the housing, a light source mounted within the housing at each end for projecting light beams in opposite directions, a third light source mounted on top of the hinged top section of the housing, light controlling lens means mounted on said top sections over said third light source, said lens means functioning to produce a predetermined light distribution, and control means for said light sources mounted within the housing on the bottom section, said control means including a plurality of control elements electrically connected with said light sources, respectively.

7. A contact or runway marker light for use on aircraft landing fields comprising, an elongated housing open at opposite ends and adapted for horizontal mounting, said housing having a hinged top section, a transparent cover member in each of the end openings of the housing, means for adjustably supporting the housing, a high-intensity light source and reflector mounted within the housing at each end for projecting high-intensity light beams in opposite directions, a low-intensity light source mounted on the top section of the housing and extending thereabove, and a pair of cup-shaped lenses mounted on said top section over said light source, said lenses functioning to control the light distribution from said low-intensity light source.

8. A high intensity contact light for use on airport runways and the like comprising, an elongated barrel-shaped housing open at opposite ends and adapted for horizontal mounting, said housing being divided in upper and lower sections hinged together at one side, said upper section having a top opening intermediate its ends, transparent cover members positioned in each end opening of the housing, a sealed-beam lamp positioned within the housing back of each cover member for projecting beams of light in opposite directions, bracket means mounted within the housing for supporting each of said lamps for adjustment in horizontal and vertical planes, a lamp mounted in the top opening of the housing and extending thereabove, an outer globe attached to the housing over said lamp and top opening, an inner globe mounted within the outer globe, said inner and outer globes functioning to provide a predetermined distribution of light from said lamp, and support means for said housing pivotally secured to the bottom of the lower housing section.

9. A high-intensity contact light for use on airport runways and the like comprising, a barrel-shaped housing with opposite end openings and a top opening intermediate its ends, said housing being split longitudinally to provide upper and lower halves, hinge means securing said halves together, means attached to the bottom of the lower housing half for adjustably supporting the housing, a transparent cover member mounted in each end opening, a high-candle power sealed-beam lamp adjustably mounted behind each cover member for projecting light beams of high intensity in opposite directions horizontally, a low candle power lamp mounted in the top opening and extending without the housing, an outer cup-shaped lens mounted on the upper half of the housing over the top opening and an inner lens mounted therein over said lamp.

10. A dual purpose contact light for use on airport runways and the like comprising, a generally barrel-shaped housing open at its ends adapted for horizontal mounting and having oppositely disposed top and bottom openings intermediate its ends, said end openings of the housing being defined by circular channels, means disposed in the bottom opening and cooperative therewith to provide a pivotally-adjustable support for the housing, a transparent cover member mounted in each end of the housing in said circular channels, sealing gaskets positioned in said channels to receive the cover members, a lamp device including a reflector and light source mounted within the housing at each end thereof behind the cover members for projecting oppositely disposed light beams in a generally horizontal plane, said lamp devices being high intensity light sources, a low-intensity lamp mounted in the top opening of the housing and extending thereabove, and lens means mounted on the housing over said lamp and opening, said lens means being effective to produce a predetermined light distribution from said lamp.

11. A contact light for use on airport runways and the like comprising, a barrel-shaped housing open at the opposite ends and having a top opening intermediate its ends, said housing being longitudinally split into two half sections, means for detachably securing said sections in assembled relation, a transparent cover member mounted in each end opening, each said cover member being disposed in sealed relation with the housing, means including a light source and reflector adjustably mounted within the housing behind each cover member for projecting light beams in opposite directions, a light source detachably mounted in the top opening of the housing and extending to the outside thereof, lens means mounted on the housing over said top opening and said light source, and said top light source being removable from the interior of said housing.

12. A high-intensity contact light for use on airport runways and the like comprising, a barrel-shaped housing with opposite end openings and a top opening intermediate its ends, said housing being split longitudinally to provide upper and lower halves, hinge means securing said halves together, means attached to the bottom of the lower housing half for adjustably supporting the housing, a transparent cover member mounted in each end opening, a high-candle power sealed-beam lamp adjustably mounted behind each cover member for projecting light beams of high intensity in opposite directions horizontally, a low candle power lamp mounted in the top opening and extending without the housing, a cup-shaped lens mounted on the upper half of the housing over said top opening and said low candle power lamp.

WILLIS A. PENNOW.

REFERENCES CITED

The following references are of record in the file of this patent:

UNITED STATES PATENTS

| Number | Name | Date |
|---|---|---|
| 1,337,880 | Benard | Apr. 20, 1920 |
| 1,413,379 | Benard | Apr. 18, 1922 |
| 1,435,002 | Goodwin et al. | Nov. 7, 1922 |
| 2,021,611 | Rolph | Nov. 19, 1935 |
| 2,155,295 | Bartow | Apr. 18, 1939 |
| 2,218,013 | Tice et al. | Oct. 15, 1940 |
| 2,360,420 | Hill | Oct. 17, 1944 |

FOREIGN PATENTS

| Number | Country | Date |
|---|---|---|
| 354,612 | Italy | Nov. 30, 1937 |

OTHER REFERENCES 1946 progress report, Illuminating Engineering, January 1947, pgs. 54 through 57.